Aug. 10, 1954    N. H. BENSCHEIDT ET AL    2,685,783
METHOD OF AND APPARATUS FOR DEHYDRATING BY FREEZING
Filed June 9, 1950
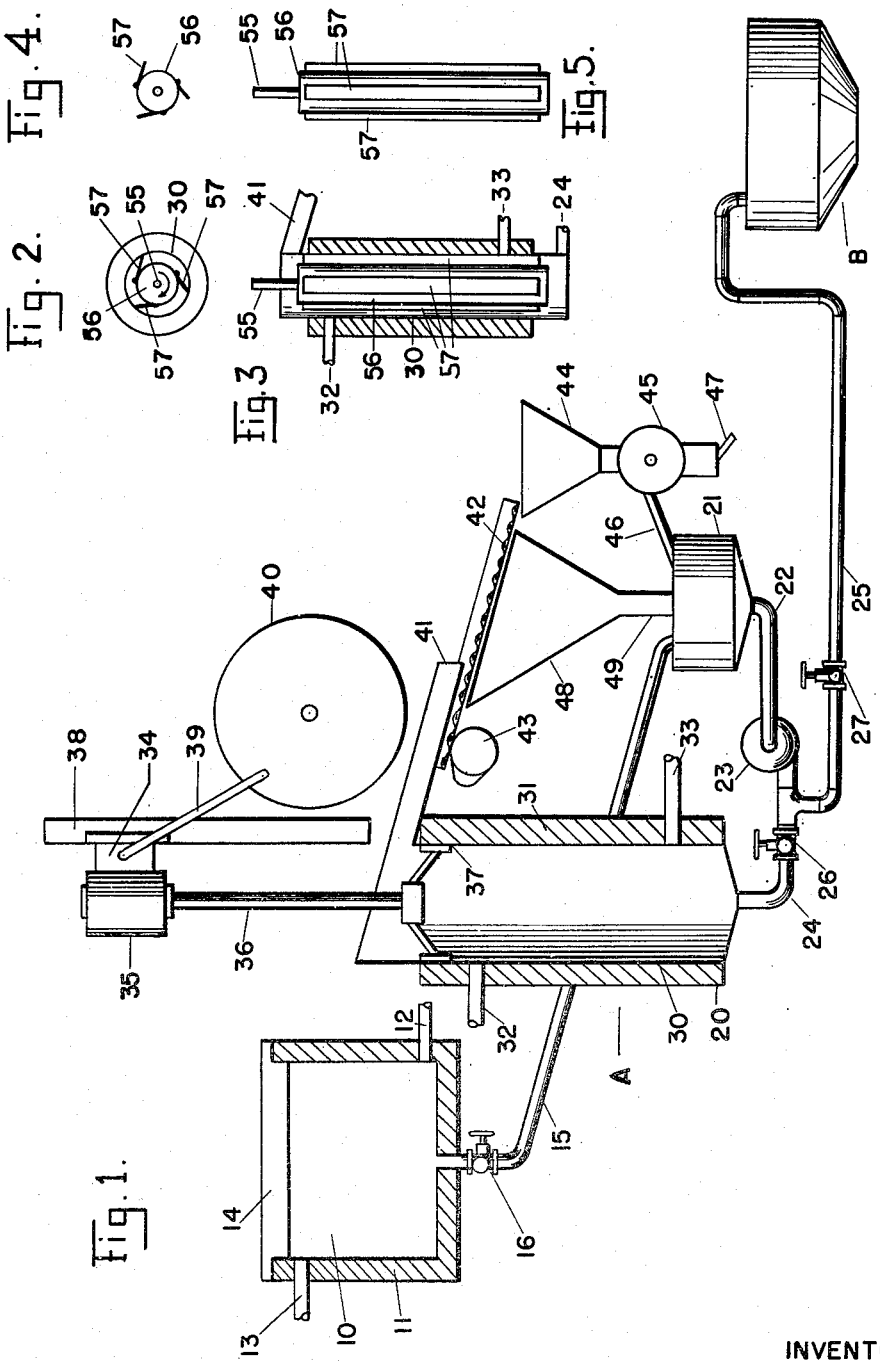
INVENTORS
NEWTON H. BENSCHEIDT
JOHN R. PATTINSON
BY
*Toulmin & Toulmin*
ATTORNEYS.

Patented Aug. 10, 1954

2,685,783

UNITED STATES PATENT OFFICE 2,685,783

METHOD OF AND APPARATUS FOR DEHYDRATING BY FREEZING

Newton H. Benscheidt and John Ralph Pattinson, Hutchinson, Kans., assignors to Commonwealth Engineering Company of Ohio, Dayton, Ohio, a corporation of Ohio Application June 9, 1950, Serial No. 167,238

6 Claims. (Cl. 62—124)

This invention relates to dehydration of solutions. More particularly, it relates to a method of dehydration by solidifying the solvent of solutions and/or suspensions. Still more particularly, it relates to dehydration of fluids bearing heat sensitive constituents through the removal of water therefrom by freezing.

It is a particular object of this invention to provide a rapid and economical means and method of removing water from fruit juices, beer, wines, pharmaceuticals such as antibiotics, heat sensitive resins, coffee, milk and vegetable juices. This list is not exclusive, but is merely supplementary.

It is also an object of this invention to provide a method wherein the solvent of a solution is progressively frozen at temperatures which result in the formation of fine solvent crystals.

It is a further object of this invention to provide a stepwise freezing process wherein a solution in which there is a small amount of seed ice is delivered to a successive and lower temperature freezing step.

This results in a concentrate from which nothing has been removed except the water and the water removal has been effected without detriment to the vitamins, volatile oils, taste, or other characteristics of the product.

It is a further object of this invention to provide a process which eliminates the necessity for low sub-zero temperatures and the expense incident to the maintenance of such conditions.

It is a still further object of the present invention to provide a process in which need for expensive equipment such as precision built centrifuges is eliminated.

It is also an object of this invention to provide relatively inexpensive processing apparatus.

It is another object of the present invention to provide a method in which a liquid having a relatively small percentage of solids will have its temperature reduced from its approximate initial ice forming point by stages, while at the same time preventing the formation of soft white ice.

It is a further object of this invention to provide a process wherein small seed crystals remain in a solution at all times while only those crystals large enough to occlude liquids are subjected to centrifugal action to recover the material removed from solution in the ice.

It will be observed that this process, instead of reducing the temperature of the solution as fast as possible to the freezing temperature of the ultimate solids content solution or product, reduces the temperature in a stepwise approach to the ultimate freezing temperature.

It is a further object to provide means of agitation to prevent the adherence of ice to the walls of the container, to maintain the ice in a state of continually controlled agitation so that the crystal growth is prevented between ice crystals and so that the ice can be removed with a minimum of juice and solids entrained or accumulated by the ice.

It is also an object of this invention to return the juice from the first stage to the second stage and from the second stage to the third stage in ice free condition.

It is an additional object of this invention to utilize the ice and ice water for reduction of the refrigeration load and for use in the initial precooling of the raw juice supply.

It is to be understood that if white ice forms it is exceedingly difficult to remove and has a tendency to clog and plug the mechanism and causes great difficulty in entrainment of juices and solids.

Another advantage of this mechanism is that it is unnecessary to fortify the resulting product with raw juice. It is current commercial practice with vacuum treated orange juice as an example to fortify the juice when dehydrated by adding about 25 percent of raw juice.

Concentration by my method can be carried to a high degree with no injury to the juice and it can be reconstituted in the hands of the user by the addition of requisite water. Nothing is lost from the juice except water and nothing is added. Heat is eliminated so as not to disturb heat sensitive materials being processed.

In the light of the foregoing, the drawings illustrating one form of the mechanism for practice in this process will be more fully understood.

Referring to the drawings:

Figure 1 is a diagrammatic view of the first stage of the equipment illustrating one embodiment of the apparatus for keeping the cooling chamber wall free of ice;

Figure 2 shows the top view of a second embodiment of apparatus for keeping the cooling chamber free of ice;

Figure 3 is an elevational view of the embodiment of Figure 2;

Figure 4 shows the top view of a scraper unit of the embodiment shown in Figure 2; and Figure 5 is an elevational view of the scraper unit, the top view of which is shown in Figure 4.

It will be observed that the process of this invention is based upon the principle of growth of substantially pure ice crystals and the removal of those ice crystals from the mother liquor which have grown to such size as to no longer be pure, i. e. contain occluded material.

It is also based upon the maintenance of small crystals of ice in the freezing solution by circulation of liquid and removal only of those crystals reaching a predetermined size.

When the temperature differential between the initial ice forming temperature of the composition and the temperature maintained in the container by the refrigerating medium is not too great, the transformation of water to ice causes a freezing point lowering for the composition. When the freezing point has been lowered to approximately the temperature imposed upon the composition ice formation ceases.

It is further based upon the principle that ice crystal propagation is enhanced by intimate contacting of water solutions with ice under strong agitating conditions.

The greater the number of nuclei started in this manner the faster the crystallizing potential of the solution is dissipated, and the shorter the time interval for each freezing operation, provided of course that adequate heat transfer is effected.

To insure that heat transfer is high and uniform, provision is made for maintaining the refrigerating surfaces free of ice. In this way the capacity is maintained at a maximum because no insulating film of ice forms between the solution and the refrigerating surface, and the ice formation is under direct control at all times.

By initiating the formation of a large number of ice crystal nuclei in the liquid circulating pump and keeping the material in motion while passing through the refrigerating zone, and dislodging ice crystals from the refrigerating surface, the ice crystals remain unattached to each other and produce a uniform dispersion of ice crystals in the liquid medium.

Further, by screening out only the oversize crystals, the solution is never without seeding nuclei, except at the start of the freezing operation, in the mixing unit and in the freezing zone.

The tabulation given later is suggestive of the ratio of temperatures. It has been found that these temperatures, while typical, represent a rule of action that secures the desired result.

The maintenance of temperatures which are continually being lowered, maintains the ice as individual crystals, solid in form and easily centrifuged. This is in marked distinction to the results obtained where the ice is warmed for partial melting or where white ice is formed having juice and solids occluded therein and the ice takes on a physical character which will disrupt the process.

We have found that by first cooling a liquid bearing solids and adjusting the difference between the temperature of the liquid and the temperature of the refrigerant by a small differential of approximately 5° to 7° and then agitate the liquid bearing the solids or seed with ice crystals or both, the liquid will immediately form ice very rapidly and the temperature rise back to the ice forming or congealing point.

To prevent such ice so forming, occluding some of the solution and the solids in the ice and to prevent the crystals of ice from growing large and forming the ice, there is provided continuous agitation to prevent cooling and ice formation at the normal congealing point, particularly in large crystals and in white ice. We secure the result of fine crystals in a large mass.

In order to obtain these fine crystals in a relatively pure form without solids, the temperature of the cooling liquid must be held practically at a constant temperature, the temperature being maintained at a predetermined lower temperature, below the ice forming temperature of the solution. In order to speed the ice crystal formation under these conditions, the system must possess high heat exchange capacity. This may be brought about by first, agitation, which brings about rapid change of the liquid interface on contact with the freeze surfaces; and, secondly, by maintaining a ratio of one square foot of cooling surface for each one to one and a half gallon of solution being treated; and, thirdly, by maintaining the flow of refrigerant capable of removing a relatively large quantity of heat.

The above process is based upon a system of heat exchange in which a low differential is maintained between the ice forming temperature of the solution and the temperature of the solution.

We also find it important that the major portion, in many instances, of the stages of progressively lowering the temperature shall be above zero, and we also find it important that the successive stages be at relatively small temperature reductions, such as about 5° and 7° F. and that the temperature of the liquid in the second stage should be approximately the temperature of the refrigerant in the first stage, and so on. It will be understood that these differentials will vary with various liquids and solutions, but the principle of the operation remains the same.

By avoiding extremes of temperature, quick freezing and by maintaining easy stages of lowering temperatures and modest differentials between the refrigerant and the liquid while causing agitation, a steady freezing of small ice crystals will take place and rapid dehydration can be effected without occluding other liquids and solids than water.

By starting, as in the case of apple juice, at a temperature of 28° F. above zero, with an outside temperature of approximately 21° F., then a temperature for the next concentration operation of 21° F., with an outside temperature of 14° F., and in a third operation with a temperature of 14° F. and an outside temperature of 7° F., and in a fourth operation, a temperature of 7° F. with an outside temperature of zero, free clear ice crystals can be secured which are easily maintained in circulation.

The operation in multiple series steps, starting with a temperature just about at the freezing point of the juice and progressive reduction in temperature and progressively removing water as ice enables this result to be secured.

In the drawings, referring specifically to Figure 1, the numeral 10 indicates a supply tank for raw juice which is maintained at a temperature of approximately 34° F. through the circulation of ice water, through a jacket 11 supplied by the pipe 12, and discharged through the pipe 13.

A cover 14 is maintained over the raw juice and where desired to avoid oxidation an inert gaseous atmosphere can be substituted for air. Additional steps may, of course, be taken to preserve the material from contamination, bacteriological and enzyme action.

Tank 10 is connected to the ice freezing system 20 through conduit 15, in which liquid flow is controlled by valve 16. Conduit 15 feeds juice into accumulator tank 21. Accumulator tank 21 is provided with a bottom outlet pipe 22 through which liquid is delivered to a centrifugal pump 23.

Liquid discharged from pump 23 travels through pipe 24 to tubular member 30. If it is desired to transfer liquid from Unit A to Unit B, liquid is diverted to a conduit 25 by closure of valve 26 and opening of valve 27 either manually or automatically.

As illustrated, liquid is pumped to tubular member 30 disposed either vertically or at a desired inclination, which tubular member is provided over a major portion of its length with a jacket 31 within which is circulated a refrigerating medium.

Refrigerating medium is supplied to jacket 31 through conduits 32 and 33.

In this mechanism little ice is formed on the interior surface of the tubular member 30 due to the small temperature differential being maintained. However, as embodied, the apparatus has a movable unit with scraper blades to insure that the walls are maintained substantially ice free, flow through the space between the tubular member wall and the rotatable cylinder being maintained by means of pump 23.

This movable unit, as illustrated in Figure 1, consists of a scraper support member having a reciprocable motor support 34.

Support 34 carries motor means 35 from which depends an elongated shaft 36. Mounted at the end of shaft 36 are scraper blades 37 which ride in contact with the inner wall of tubular member 30.

Support member 34 reciprocates on a guide support 38 actuated by link 39 which in turn is driven by rotating wheel 40. Wheel 40 is rotated by a source of power not shown.

As illustrated in Figures 2 to 5, inclusive, the movable unit consists of a stub shaft 55 carrying a cylinder 56 extending along the longitudinal axis of the tubular member 30.

Mounted on cylinder 56 are scraper blades 57 extending the full length of the cylinder and joined thereto by suitable hinge means 58. Scraper blades 57 thus ride in contact with the inner surface of tubular member 30.

Either of the above movable units may be positioned within the tubular member 30.

Tubular member 30 is provided with a fluid outlet 41 which discharges ice and liquid onto a screen 42. Screen 42 is shown resting in contact with an eccentric 43 rotated by a source of power not illustrated.

The vibration of the screen plus its angle of inclination causes ice crystals retained on the screen to travel to the lower end from which they discharge into a funnel or hopper 44.

The funnel 44 discharges ice crystals to a centrifuge 45. Centrifuge 45 separates adhering liquid from the crystals. Liquid from centrifuge 45 is returned to accumulator tank 21 through pipe 46. The pure ice is carried away by a conduit 47.

Liquid and small ice crystals passing through the screen 42 are collected by a funnel 48 and directed back to the accumulator tank 21 through conduit 49.

When multiple stage operation is intended duplicate apparatus is set up for each stage, exclusive of a raw juice tank 10 and its related equipment.

Screen 42 may be varied in mesh according to the size of the crystals which it is desired to segregate. In general, the screen should separate particles in the size range of 100 to 250 microns and larger, i. e., material retained on screens of approximately 150 to 40 mesh.

The above system is adaptable to the concentration of small batches or to the joining of several stages of identical apparatus for the successive dehydration of large batches of material.

When small batches of material are being processed material is recirculated in apparatus indicated "A" until freezing ceases under the imposed freezing conditions and then the operation repeated with lower temperatures being stepwise maintained by introduction of a cooler refrigerant in the shaft 31 of the tubular member 30.

In each step the juice is allowed to remain only for that period necessary to produce a new crop of ice crystals and then the conditons are changed to the next lower freezing stage condition.

The final product can be either shipped in frozen form in the sense that it is refrigerated, or it can be packed and preserved without refrigeration if the concentration is more than 60 percent. The sugar enables the preservation to be successfully accomplished over an extended period of time at room temperature.

The problem of formation of white ice, it will be observed, has been overcome in the disclosed process and clear crystal ice is formed thereby. The crystals are relatively small and the maximum number of nuclei are maintained at all times to facilitate very rapid freezing. The slush formed and the dehydrated liquid can be easily handled in the manner of liquid circulation.

*Freezing conditions and procedure for freezing operations*

Apple juice introduced into tank 21 from tank 10 when circulated by pump 23 passes through tubular member 30 wherein the temperature of the liquid is brought down to about 21° F., which temperature is about 7° below the critical congealing or ice forming point of raw apple juice.

Each successive stage or freezing is then maintained at approximately 7° lower than the preceding stage. The refrigerant is controlled for each cylinder jacket at a differential of approximately 7° lower than the temperature in the cylinder. A typical set of examples of how this works is as follows:

EXAMPLE I.—*Per cent solids—Apple Juice*

Initial ice forming point—approximately 28° F.

1 Tank—Juice at 21° F., Refrigerant 14° F.
2 Tank—Juice at 14° F., Refrigerant 7° F.
3 Tank—Juice at 7° F., Refrigerant 0° F.
4 Tank—Juice at 0° F., Refrigerant —7° F.

Different liquids have different initial congealing points so that a temperature scale must be established for each material processed. Various temperatures at which ice crystals may form may be used in each or all of the cylinders.

It will be understood that the following claims comprehend various changes in temperature, mechanism, speed of operation, of ice removal, and apparatus according to the materials being processed.

We claim:

1. In combination in an apparatus for concentrating solutions containing a crystallizable solvent, a container for the solution, a jacket surrounding said container whereby refrigerant in said jacket and liquid in said container are in heat interchanging relationsip, a fluid inlet for said container, a fluid outlet for said container, a screen adapted to receive material discharged from said container, vibratory means for said screen adapted to discharge material not passing through said screen, means comprising a centrifuge for removing liquid from the solids discharged from said screen, accumulating means for material passing through said screen, conduit means for returning separated liquid from the liquid separating means to said accumulating means, and an agitating and liquid circulating means adapted to receive said material from said accumulating means and deliver the same to said container.

2. In combination in an apparatus for concentrating solutions containing water, a container for the solution, movable scraper means positioned within said container for removing ice from the chamber interior surface, a jacket surrounding said container whereby refrigerant in said jacket and liquid in said container are in heat interchanging relationship, a fluid inlet for said container, a fluid outlet for said container, a screen adapted to receive material discharged from said container, vibratory means for said screen adapted to discharge material not passing through said screen, means comprising a centrifuge for removing liquid from the solids discharged from said screen, accumulating means for material passing through said screen, conduit means for returning separated liquid from the liquid separating means to said accumulating means, and an agitating and liquid circulating means adapted to receive said material from said accumulating means and deliver same to said container.

3. In a method of freeze dehydration, passing a body of liquid containing water through a freezing chamber; refrigerating the same to cause water in the liquid to freeze into ice crystals in the chamber; forcing crystals and liquid out of the container by fluid pressure whereby the crystals float from the container with the liquid; separating the crystals and the liquid; separating a part of the liquid from the crystals; mechanically removing the remaining liquid from the crystals and introducing the same into the liquid first separated; and returning the thus concentrated liquid under conditions of agitation to the chamber for a similar successive treatment of freeze dehydration.

4. In a method of freeze dehydration, passing a body of liquid containing water through a freezing chamber; subjecting said chamber to a freezing temperature to cause said water to be formed into ice crystals in the chamber; forcing the ice crystals and liquid out of said chamber; separating the crystals and the liquid; draining under agitation a part of the liquid from the crystals; separately mechanically removing the remaining liquid from the crystals and introducing the same into the liquid previously drained therefrom; and returning the thus concentrated liquid under conditions of agitation to the chamber for a similar successive treatment of freeze dehydration.

5. An apparatus for concentrating solutions containing water, said apparatus comprising a container for the solution, a jacket surrounding said container whereby refrigerant in said jacket and liquid in said container are in heat interchanging relationship, a fluid inlet for said container, a fluid outlet for said container, rotatable and reciprocable scraper means mounted within said container and operable for maintaining the interior surface thereof substantially free of ice, screen means adapted to receive discharge material from said container, a centrifuging means arranged to receive ice crystals segregated by said screen means, accumulating means for receiving material passing through said screening means, means for conveying liquid from said centrifuging means to said accumulating means, and an agitating and liquid circulating means adapted to receive said material from said accumulating means and deliver the same to said container.

6. In a method of freeze dehydration of a solution containing heat-sensitive constituents and a crystallizable liquid solvent, the steps of (a) flowing said solution along in a circuitous path, (b) lowering the temperature of said solution below that where solidification of said crystallizable solvent takes place whereby a part of said solvent crystallizes out during a portion of the travel of said solution, (c) separating crystals of said solvent from said liquid which have crystallized out and are of a predetermined maximum size, (d) separating a part of the liquid from said crystals, (e) mechanically removing the remaining liquid occluded with said crystals of solvent, and (f) combining said separated liquids with the remaining solution after removal of said crystals of solvent and which contain smaller size crystals of said solvent than said maximum and recirculating the same back to the zone where the same is again subjected to freezing and crystallization temperatures.

References Cited in the file of this patent

UNITED STATES PATENTS

| Number | Name | Date |
| --- | --- | --- |
| 633,206 | Miles | Sept. 19, 1899 |
| 1,359,911 | Oman | Nov. 23, 1920 |
| 1,558,619 | Jones | Oct. 27, 1925 |
| 1,576,137 | Johnson | Mar. 9, 1926 |
| 1,738,275 | Baker | Dec. 3, 1929 |
| 2,119,182 | Schuftan et al. | May 31, 1938 |
| 2,337,317 | Eggert | Dec. 21, 1943 |
| 2,552,523 | Cunningham | May 15, 1951 |
| 2,552,524 | Cunningham | May 15, 1951 |

OTHER REFERENCES

Publication: Report on Operations (1948). The Commonwealth Engineering Company. Pages 8 and 9 relied on.